(12) United States Patent
Richerson et al.

(10) Patent No.: US 11,725,619 B2
(45) Date of Patent: Aug. 15, 2023

(54) ALIGNMENT SYSTEM AND ASSOCIATED METHOD

(71) Applicant: Transportation IP Holdings, LLC, Norwalk, CT (US)

(72) Inventors: Jay Richerson, Erie, PA (US); Adam Edgar Klingbeil, Ballston Lake, NY (US); Eric Dillen, Erie, PA (US); Kevin Bailey, Mercer, PA (US); Kent Jeffries, Erie, PA (US); Brett Heher, Pittsburgh, PA (US); Manuel Licon Flores, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 17/542,966

(22) Filed: Dec. 6, 2021

(65) Prior Publication Data

US 2022/0268248 A1 Aug. 25, 2022

Related U.S. Application Data

(60) Provisional application No. 63/152,665, filed on Feb. 23, 2021.

(51) Int. Cl.
*F02M 65/00* (2006.01)
*F02M 61/14* (2006.01)
*G01B 11/27* (2006.01)

(52) U.S. Cl.
CPC ........... *F02M 65/00* (2013.01); *G01B 11/272* (2013.01)

(58) Field of Classification Search
CPC .............. F02B 23/0645; F02B 23/0648; F02B 23/0654; F02M 61/14; F02M 61/162;
(Continued)

(56) References Cited

U.S. PATENT DOCUMENTS

| 1,136,818 A | 4/1915 | Leissner |
| 1,213,911 A | 1/1917 | Schmid |

(Continued)

FOREIGN PATENT DOCUMENTS

| DE | 102004011169 A1 | 9/2005 |
| DE | 102018133036 A1 | 7/2019 |

(Continued)

OTHER PUBLICATIONS

First Examination Report dated Mar. 3, 2022 for corresponding Australian Patent Application No. 2021201025 (4 pages).

(Continued)

*Primary Examiner* — Phutthiwat Wongwian
*Assistant Examiner* — Arnold Castro
(74) *Attorney, Agent, or Firm* — The Small Patent Law Group LLC; Christopher R. Carroll

(57) ABSTRACT

An alignment system includes an optical sensor device that may be inserted into a passage of a body that is located between a fuel injector and a combustion chamber of an engine cylinder. The body is shaped to transmit fuel ejected from a spray hole in a fuel injector into the combustion chamber of the engine cylinder. The system also includes a controller that may examine output of the optical sensor device and determine whether the passage of the body is aligned with the spray hole of the fuel injector based on the output from the optical sensor device. The controller may change a position of one or more of the body or the fuel injector responsive to determining that the passage of the body is not aligned with the spray hole of the fuel injector.

19 Claims, 10 Drawing Sheets

(58) Field of Classification Search
CPC ........... F02M 61/1806; F02M 61/1813; F02M 65/00; G01B 11/272
See application file for complete search history.

(56) References Cited

U.S. PATENT DOCUMENTS

| | | | |
|---|---|---|---|
| 1,260,408 A | 3/1918 | Leissner | |
| 1,747,935 A | 2/1930 | Hemmingsen | |
| 1,948,557 A | 2/1934 | Baur | |
| 2,470,351 A * | 5/1949 | Hartridge | F02M 65/00 73/114.49 |
| 2,631,577 A | 3/1953 | Carter | |
| 2,733,630 A * | 2/1956 | Saives | F02M 65/00 356/391 |
| 3,683,873 A | 8/1972 | Tarter | |
| 3,785,628 A | 1/1974 | Lang | |
| 4,112,906 A | 9/1978 | Spencer | |
| 4,177,948 A | 12/1979 | Schaffitz et al. | |
| 4,566,634 A | 1/1986 | Wiegand | |
| 4,620,516 A | 11/1986 | Reum et al. | |
| 5,024,193 A | 1/1991 | Graze, Jr. | |
| 5,035,358 A | 7/1991 | Katsuno et al. | |
| 5,067,467 A | 11/1991 | Hill et al. | |
| 5,218,943 A | 6/1993 | Takeda | |
| 5,315,973 A | 5/1994 | Hill et al. | |
| 5,345,913 A | 9/1994 | Belshaw et al. | |
| 5,772,122 A | 6/1998 | Sugiura et al. | |
| 5,775,355 A | 7/1998 | Maier et al. | |
| 6,095,437 A | 8/2000 | Nozawa et al. | |
| 6,119,658 A | 9/2000 | Jehle et al. | |
| 6,698,412 B2 | 3/2004 | Dalla Betta | |
| 7,028,918 B2 | 4/2006 | Bechanan et al. | |
| 7,210,448 B2 | 5/2007 | Stanton et al. | |
| 7,213,564 B2 | 5/2007 | Hill et al. | |
| 7,383,818 B1 | 6/2008 | Beardmore | |
| 7,484,499 B2 | 2/2009 | Beardmore | |
| 8,668,156 B2 | 3/2014 | Lee et al. | |
| 8,950,176 B2 | 2/2015 | Uzkan et al. | |
| 8,960,156 B2 | 2/2015 | Martinsson et al. | |
| 9,243,580 B2 | 1/2016 | Mariucci | |
| 9,429,127 B2 | 8/2016 | Hongo et al. | |
| 9,506,439 B2 | 11/2016 | Anders et al. | |
| 9,587,606 B2 | 3/2017 | Anders et al. | |
| 9,797,351 B2 | 10/2017 | Svensson et al. | |
| 9,803,538 B2 | 10/2017 | Anders et al. | |
| 9,890,689 B2 | 2/2018 | Hampson et al. | |
| 10,012,196 B1 * | 7/2018 | Qi | F02B 23/0648 |
| 10,036,355 B2 | 7/2018 | Franks et al. | |
| 10,041,440 B2 | 8/2018 | Di Pietro | |
| 10,072,606 B2 | 9/2018 | Brunner | |
| 10,451,014 B2 | 10/2019 | Ting et al. | |
| 10,711,752 B2 | 7/2020 | Martin et al. | |
| 10,808,601 B2 | 10/2020 | Hashizume | |
| 11,008,932 B2 | 5/2021 | Klingbeil et al. | |
| 2002/0002967 A1 | 1/2002 | Paul et al. | |
| 2003/0155432 A1 | 8/2003 | Buchanan et al. | |
| 2003/0196634 A1 | 10/2003 | Lausch et al. | |
| 2009/0320774 A1 | 12/2009 | Liebsch et al. | |
| 2010/0236533 A1 | 9/2010 | Meldolesi et al. | |
| 2011/0067653 A1 | 3/2011 | Clark et al. | |
| 2011/0068188 A1 | 3/2011 | Laimboeck | |
| 2011/0126462 A1 | 6/2011 | Livshits et al. | |
| 2011/0239751 A1 | 10/2011 | Cueto | |
| 2012/0186555 A1 | 7/2012 | Mueller | |
| 2014/0084085 A1 | 3/2014 | Hongo et al. | |
| 2014/0150758 A1 | 6/2014 | Zurlo et al. | |
| 2015/0211410 A1 | 7/2015 | Saville et al. | |
| 2015/0211461 A1 * | 7/2015 | Shirk | F02M 61/1826 239/557 |
| 2015/0219051 A1 * | 8/2015 | Carpenter | F02M 61/1813 239/584 |
| 2016/0024994 A1 | 1/2016 | Engineer | |
| 2016/0084411 A1 * | 3/2016 | Laws | F02M 55/004 285/39 |
| 2016/0097360 A1 | 4/2016 | Mueller | |
| 2016/0245224 A1 | 8/2016 | Ruona et al. | |
| 2016/0298528 A1 | 10/2016 | Svensson | |
| 2016/0298529 A1 | 10/2016 | Anders et al. | |
| 2016/0298584 A1 | 10/2016 | Svensson | |
| 2016/0303672 A1 * | 10/2016 | Onley | B23G 7/00 |
| 2016/0327000 A1 | 11/2016 | John | |
| 2017/0009712 A1 | 1/2017 | Svensson et al. | |
| 2017/0089310 A1 | 3/2017 | Svensson | |
| 2017/0114763 A1 | 4/2017 | Mueller | |
| 2018/0149125 A1 | 5/2018 | Ting et al. | |
| 2018/0195430 A1 | 7/2018 | Fitzgerald | |
| 2018/0202403 A1 * | 7/2018 | Huff | F02M 61/162 |
| 2019/0017464 A1 | 1/2019 | Schlee | |
| 2019/0063391 A1 | 2/2019 | Martin et al. | |
| 2019/0218959 A1 | 7/2019 | Klingbeil et al. | |
| 2020/0040857 A1 | 2/2020 | Kurtz et al. | |
| 2020/0191045 A1 | 6/2020 | Gubba | |

FOREIGN PATENT DOCUMENTS

| | | |
|---|---|---|
| JP | 831250 A | 11/1996 |
| JP | 2012125711 A | 7/2012 |
| KR | 100665727 B1 | 1/2007 |
| WO | 2007058103 A1 | 5/2007 |
| WO | 2015187653 A1 | 12/2015 |

OTHER PUBLICATIONS

O'Connor et al., "Post Injections for Soot Reduction in Diesel Engines: A Review of Current Understanding", Sae Int. J. Engines, vol. 06, Issue: 01, pp. 400-421, 2013.

O'Connor et al., "Effect of Load on Close Coupled Post-Injection Efficacy for Soot Reduction in an Optical Heavy-Duty Diesel Research Engine", J. Eng. Gas Turbines Power, vol. 136, Issue: 10, pp. 16, May 2, 2014.

Office Action dated Aug. 21, 2020 for corresponding DE Application No. 10 2018 133 036.7 (12 pages).

Camillo "Best Practices for Press-Fit Assembly" AssemblyMag. com; Sep. 14, 2017 (4 pages).

Examination Report dated Nov. 22, 2022 for corresponding German Application No. 102021103946.0 (36 pages) Machine English translation provided.

First Office Action dated Nov. 3, 2022 for Chinese Application No. 2021102128391 (14 pages).

English translation of the First Office Action dated Nov. 3, 2022 for Chinese Application No. 2021102128391 (17 pages).

Examination Report dated Jun. 2, 2023 for corresponding Australian Application No. 2022201015 (5 pages).

* cited by examiner

ALIGNMENT SYSTEM AND ASSOCIATED METHOD

CROSS-REFERENCE TO RELATED APPLICATIONS

This application claims priority to U.S. Provisional Application No. 63/152,665 (filed 23 Feb. 2021), the entire disclosure of which is incorporated herein by reference.

GOVERNMENT LICENSE RIGHTS

This invention was made with government support under Cooperative Agreement DEEE0009199 awarded by Office of Energy Efficiency and Renewable Energy. The government has certain rights in the invention.

BACKGROUND

Technical Field

The subject matter described herein relates to an alignment system and method for a fuel stream and a fuel passageway.

Discussion of Art

Spray inserts are installed in engine cylinder head assemblies beneath fuel injectors. The spray inserts include inlets into which fuel is received from the fuel injectors. The fuel is transmitted into fuel passages extending through and out of the inserts. Additional air or gas passages allow air or other gas to flow into the inserts (from outside of the inserts), where the fuel entrains the air inside the inserts to form a fuel-air mixture. The fuel-air mixture is transmitted out of the inserts into combustion chambers of engine cylinders. This may result in longer mixing times, enhanced combustion, and lower emissions.

The fuel injectors eject fuel out of injector spray holes and into corresponding passages. There is a need to be aligned with the inlets. This alignment may be with regard to the fuel stream and a center of a fuel passage in the spray insert. If the alignment is incorrect, the fuel may be blocked from reaching the combustion chamber (thereby preventing combustion in the cylinder from occurring). Or, if the alignment is incorrect, the fuel spray can impinge on edges of the inlets of the inserts. This can cause poor atomization of the fuel or loss of spray momentum and, consequently, poor or inconsistent combustion within the combustion chamber.

One technique for aligning one or more interior passage of the insert relative to a spray hole of a fuel injector involves inserting a small drill bit or small gauge wire into the spray hole of the fuel injector. The fuel injector is rotated until the bit or wire is received in the center of the passage of the insert. One problem with this technique is that the bit or wire may shear off during rotation of the fuel injector, thereby damaging the fuel injector. Another technique for aligning the insert passage with the fuel injector spray hole involves installing a nylon plug into the insert passage. The fuel injector is then controlled (e.g., fired) to eject fuel, which leaves a mark on the plug. The location of the mark is then inspected to determine whether to rotate the fuel injector or spray insert to align the insert passage with the fuel injector spray hole. But this technique can be difficult to assemble, can contaminate the fuel injector and/or spray insert, and can be time consuming. Because of the limitations of these approaches, neither of these techniques is suitable for mass production. It may be desirable to have a system or method that differs from those that are currently available.

BRIEF DESCRIPTION

In one embodiment, a method is provided that includes inserting an optical sensor device into a passage of a body that is located between a fuel injector and a combustion chamber of an engine cylinder. The body is shaped to transmit fuel ejected from a spray hole in a fuel injector into the combustion chamber of the engine cylinder. The method also includes determining whether the passage of the body is aligned with the spray hole of the fuel injector based on output from the optical sensor device and changing a position of one or more of the body or the fuel injector responsive to determining that the passage of the body is not aligned with the spray hole of the fuel injector.

In one embodiment, an alignment system includes an optical sensor device that may be inserted into a passage of a body that is located between a fuel injector and a combustion chamber of an engine cylinder. The body is shaped to transmit fuel ejected from a spray hole in a fuel injector into the combustion chamber of the engine cylinder. The system also includes a controller that may examine output of the optical sensor device and determine whether the passage of the body is aligned with the spray hole of the fuel injector based on the output from the optical sensor device. The controller may change a position of one or more of the body and/or the fuel injector responsive to determining that the passage of the body is not aligned with the spray hole of the fuel injector.

BRIEF DESCRIPTION OF THE DRAWINGS

The inventive subject matter may be understood from reading the following description of non-limiting embodiments, with reference to the attached drawings, wherein below.

DETAILED DESCRIPTION

The subject matter described herein relates to a system and method for aligning a liquid stream with a receiving conduit, passage, aperture or opening. In one embodiment, the subject matter relates to a combustion device fuel supply system, in which a nozzle of a fuel injector needs to be aligned with a fuel passage that receives a fuel spray from the nozzle and entrained air. In one example, the subject matter described herein relates to combustion devices (e.g., ducted fuel injection, spray inserts that alter the trajectory of fuel spray as the, etc.) where a fuel passage or other component needs locating or alignment near a fuel injector for operation.

With regard to fuel, the fuel may be a single fuel type in one embodiment and in other embodiments the fuel may be a mixture or combination of a plurality of different fuels. In one example of a fuel mixture, a first fuel may be liquid and a second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one embodiment, fuel may be inclusive of stored energy as used herein.

In one embodiment, an alignment and inspection system are provided. The system includes an optical sensor device that may be inserted into a fuel or gas (e.g., air) passage of a body that is located between a fuel injector and a combustion chamber of an engine cylinder, the body configured to transmit fuel ejected from a spray hole in a fuel injector into the combustion chamber of the engine cylinder. A controller may examine an output of the optical sensor device and may determine whether the fuel passage of the body is aligned with the spray hole of the fuel injector based on the output from the optical sensor device. The controller may change a position of one or more of the body or the fuel injector responsive to determining that the fuel passage of the body is not aligned with the spray hole of the fuel injector.

A method is provided in another embodiment. The method may include inserting an optical sensor device into a passage of a body that is located between a fuel injector and a combustion chamber of an engine cylinder, the body configured to transmit fuel ejected from a spray hole in a fuel injector into the combustion chamber of the engine cylinder. The alignment of the fuel passage of the body with the spray hole of the fuel injector based on output from the optical sensor device may be determined. And, a position of one or more of the body or the fuel injector may be changed responsive to determining that the fuel passage of the body is not aligned with the spray hole of the fuel injector.

Figure 1:
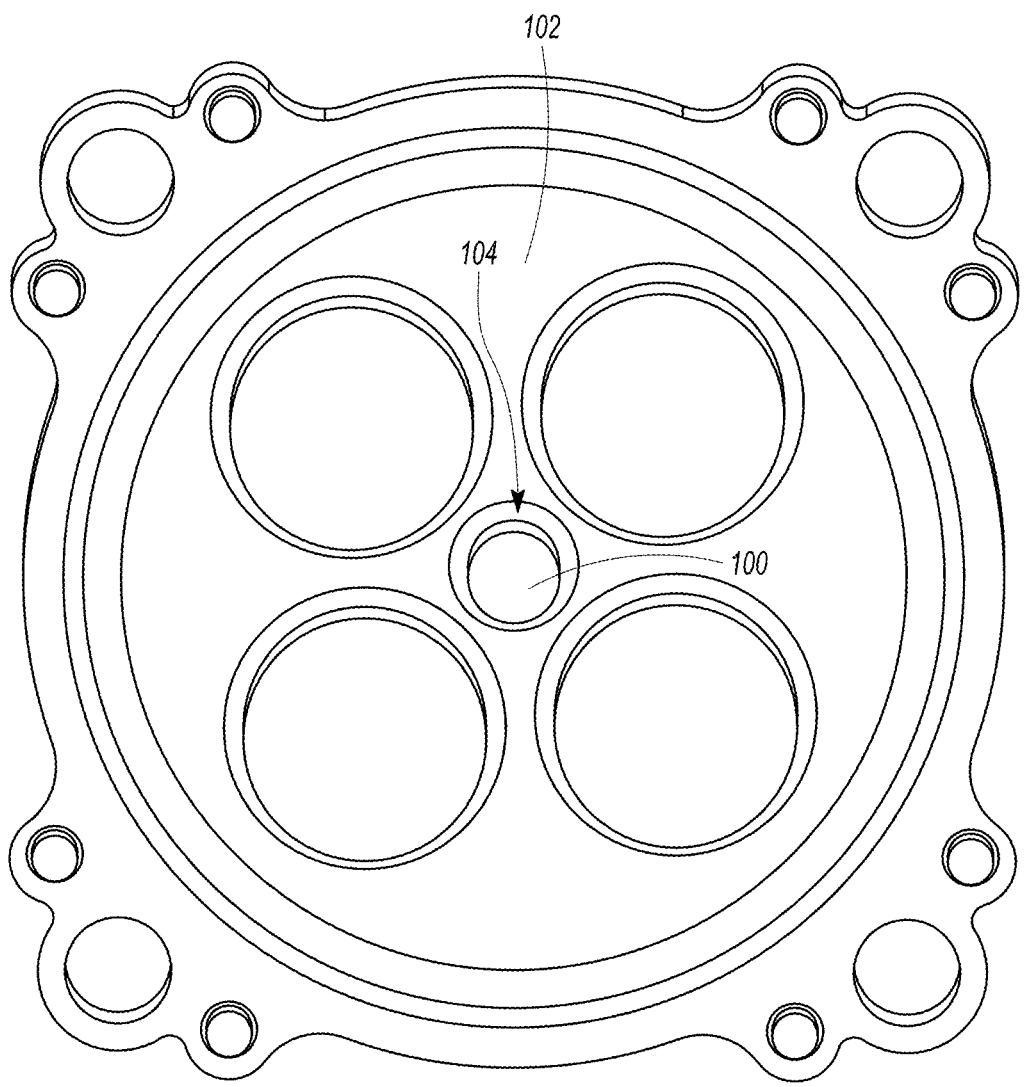
FIG. 1 illustrates an example of a spray insert coupled with a cylinder head of an engine cylinder.

FIG. 1 illustrates an example of a spray insert or spray insert device 100 coupled with a cylinder head 102 of an engine cylinder. The spray insert may be disposed over a fuel injector (shown in FIG. 4) such that fuel sprayed by the fuel injector is received into the spray inserts, mixed with air or other gases in the spray insert, and the mixture of fuel and air exits out of the spray insert via outlets 104 of the spray insert. During operation, the spray insert transmits the mixture of fuel and air into the combustion chamber of the engine cylinder.

Figure 2:
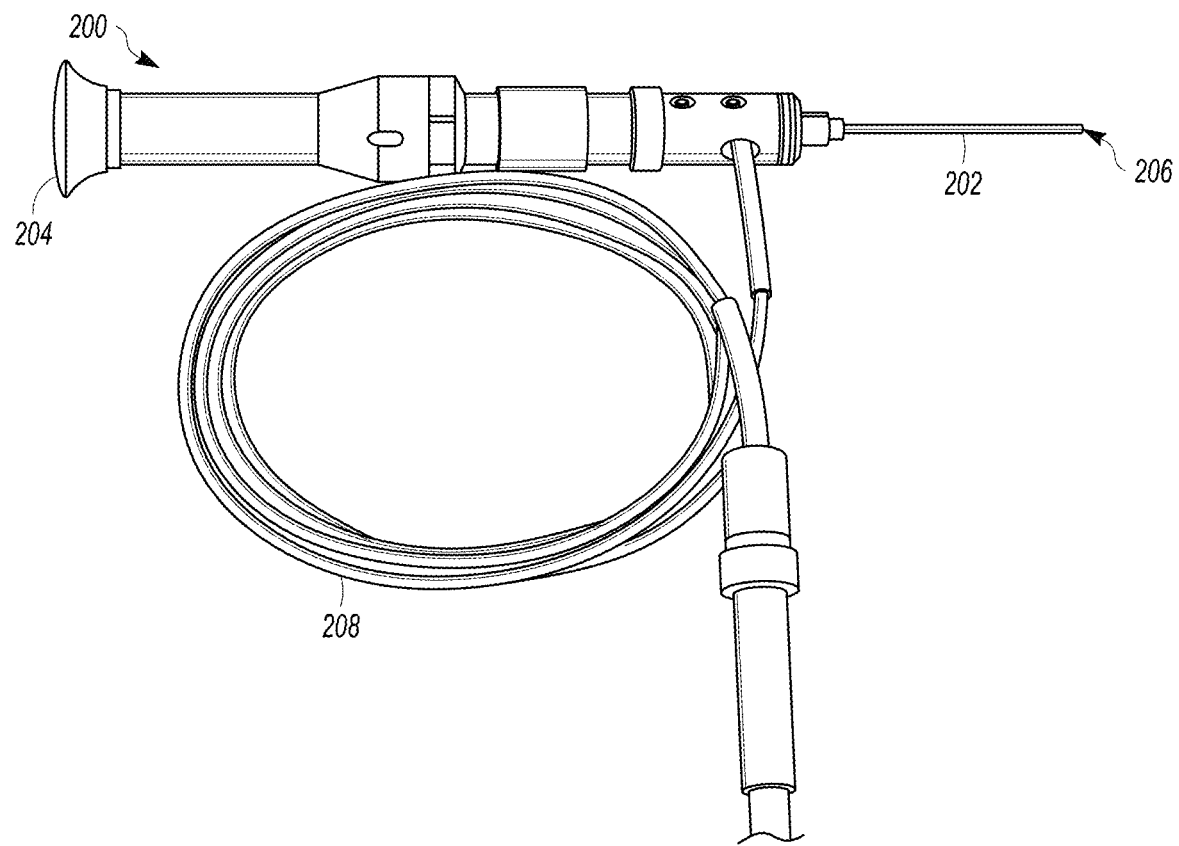
FIG. 2 illustrates an example of an optical sensor device.

FIG. 2 illustrates an example of an optical sensor device 200. The sensor device can be used to align and/or verify alignment of the spray insert with the fuel injector, as described herein. In the illustrated example, the sensor device is a borescope having a thin flexible tube 202 with an eyepiece or camera connector 204 at one end of the sensor device and a lens 206 on the other end of the sensor device (and at the end of the flexible tube). A cabled light source 208 can include fiber optic cable to deliver direct light along the length of the flexible tube. A user of the sensor device can look through the eyepiece to view the field of view of the lens. Alternatively, a camera can be coupled with the camera connector to generate images or video of the field of view of the lens. Optionally, the camera can be used to record images and/or video of the field of view of the lens.

Figure 3:
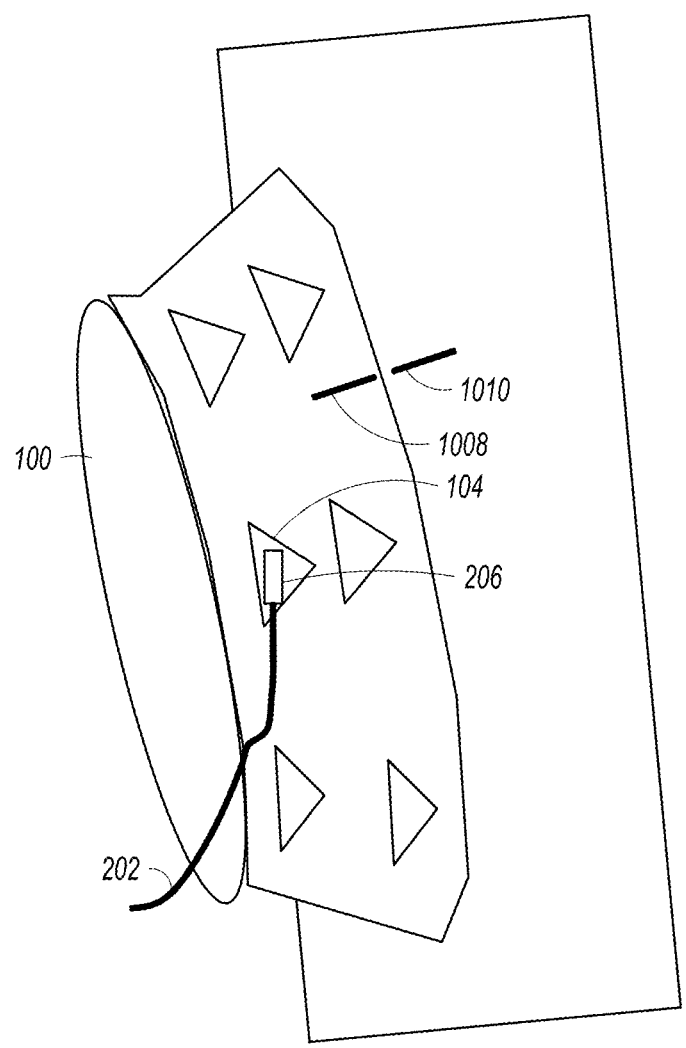
FIG. 3 illustrates insertion of the sensor device shown in FIG. 1 into the spray insert shown in FIG. 1.
Figure 4:
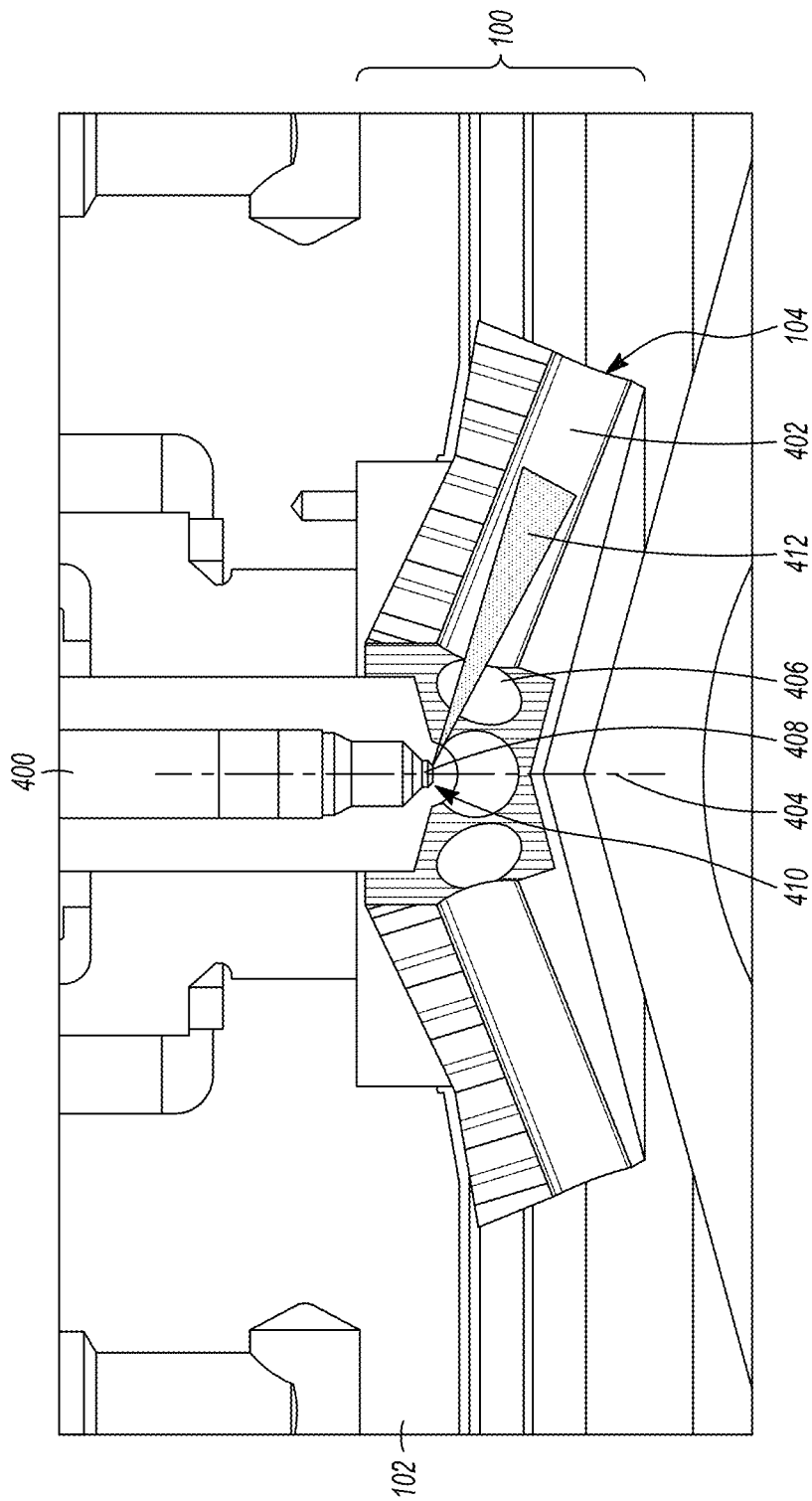
FIG. 4 illustrates a cross-sectional view of the cylinder head, the spray insert, and a fuel injector.

FIG. 3 illustrates insertion of the sensor device into the spray insert and FIG. 4 illustrates a cross-sectional view of the cylinder head, the spray insert, and a fuel injector 400. The spray insert can include several interior fuel passages 402, or instead may include ducts, disposed at different locations around a center axis 404 of the spray insert. Each of the interior passages extends in the spray insert from an inlet opening 406 of the spray insert to a corresponding outlet. The lens or camera end of the sensor device can be inserted into one of the outlets of the spray insert (as shown in FIG. 3) and directed toward a spray hole 408 in a distal tip 410 of the fuel injector. The fuel injector may include several spray holes. Fuel 412 is ejected out of the tip of the fuel injector out of the spray holes. As shown in FIG. 3 and described below in connection with FIG. 10, marks 1008, 1010 may be added to or fabricated in the spray insert and the cylinder head to assist with aligning the spray insert with the fuel injector.

Figure 5:
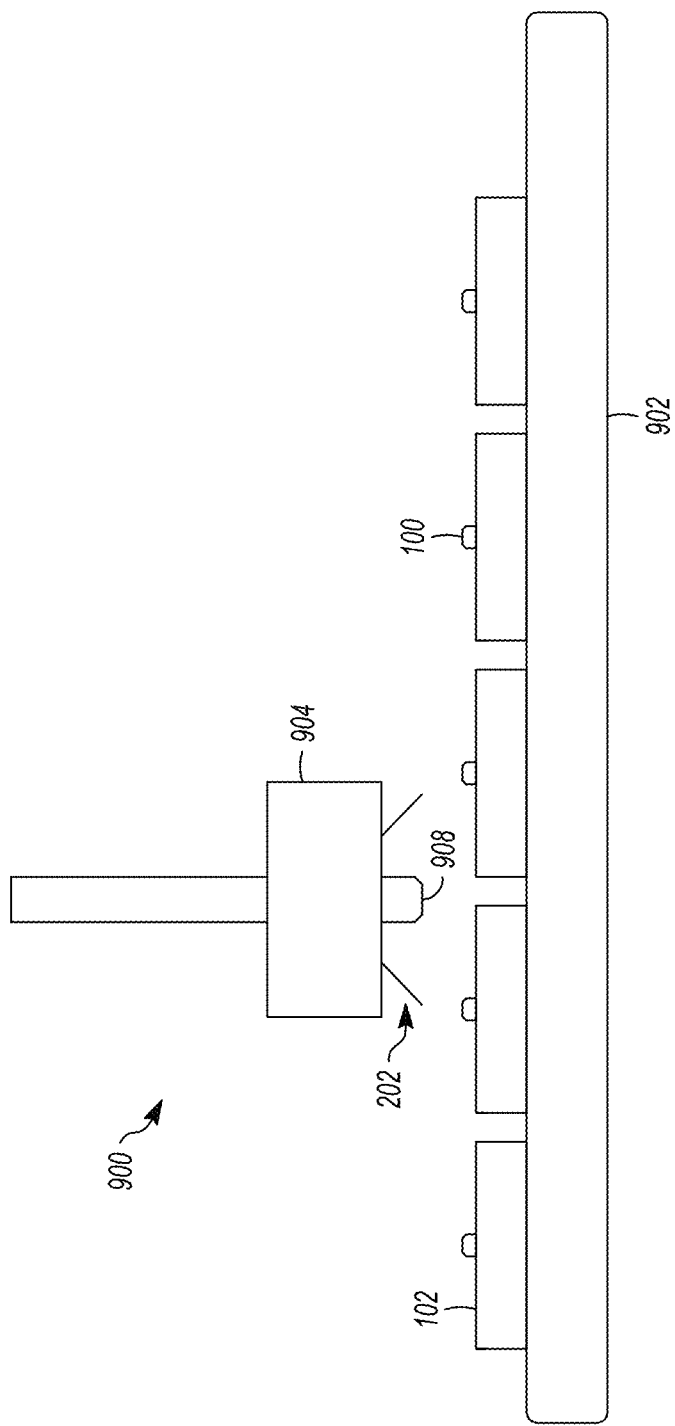
FIG. 5 schematically illustrates one example of an automated inspection system.

An operator or an automated inspection system view the interior of the passage in the spray insert to determine whether the inlet opening and interior passage of the spray insert is aligned with the spray hole. In one embodiment, the sensor device may be manually used by an operator to visually inspect the interior of the passage. In another embodiment, an automated inspection system can be used to automatically inspect the interior of the passage. FIG. 5 schematically illustrates one example of an automated inspection system 900, which also can be referred to as a conduit or passage alignment system. The inspection system can include a conveyor 902 on which one or more cylinder heads are disposed with the spray inserts on the cylinder heads. The inspection system also can include a controller 904 having one or more flexible tubes of the sensor device described above. The controller can include hardware circuitry that includes and/or connects with one or more processors (e.g., one or more integrated circuits, field programmable gate arrays, field programmable gate arrays, etc.) and cameras coupled with the flexible tubes (e.g., optical fibers) that examine the field of view of the lenses at the ends of the flexible tubes. The controller can examine the images or video output by the cameras to determine whether the interior passages of the spray inserts are aligned with the spray holes of the fuel injectors. The conveyor can move one or more of the inserts within reach of the flexible tubes of the controller so that the controller can examine one or multiple inserts at the same time. Optionally, the inspection system can include a robotic arm 908 that can grasp and change a position of the spray insert or replace the spray insert for those spray inserts that are misaligned with the spray holes of the fuel injectors. Alternatively, the robotic arm may be on the other side of the cylinder head to grasp and move the fuel injectors having the spray holes that are not aligned with the interior passages of the spray inserts. Alternatively, the robotic arm may place the insert in the cylinder head while simultaneously aligning the insert to the injector.

The focus or focal point of the sensor device can be checked and modified, if needed, prior to inserting the lens end of the sensor device into the outlet of the interior passage in the spray insert. If the spray hole center and the center of the interior passage are not aligned with each other, the fuel injector and/or the spray insert can be moved relative to the other. For example, the fuel injector may be rotated, the spray insert may be rotated, both the fuel injector and the spray insert may be rotated (e.g., in opposite directions), the fuel injector and/or spray insert may be axially moved relative to the other, a torque or seating force applied on the injector, insert, or other component can be increased or decreased, shims may be inserted (or removed), the thickness of a sealing washer can be adjusted, or the like. Optionally, instead of changing a position of the fuel injector and/or spray insert, a different spray insert may be used. For example, different fuel inserts may have interior passages at different axial positions in the inserts (e.g., at different locations between a top side of the insert that faces away from the combustion chamber and an opposite bottom side of the insert that faces the combustion chamber). If a first fuel insert does not have the interior passages aligned with the spray holes of the fuel injector, then the first fuel insert can be removed and replaced with a different, second fuel insert having interior passages at different axial distances from the fuel injector. The alignment of the interior passages and spray holes can be checked and, if misalignment exists, the second fuel insert can be replaced with another spray insert having interior passages in other positions. This process can be continued until a spray insert having interior passages that are aligned with the spray holes is found.

As another example, several different fuel inserts having different sizes and/or passages in different locations may be grouped, binned, or otherwise organized into different sets or groups so that similarly or identically sized fuel inserts and/or inserts having the passages in the same locations are in the same set or group. A measurement of the cylinder head and/or fuel injector may be made (e.g., a measurement of how far the distal tip of the fuel injector outwardly projects from a surface of the cylinder head). Different groups or sets of the inserts may be associated with different measurements (or ranges of measurements). An operator or the automated inspection system can then select a fuel insert from the set associated with the measurement and then attached to the cylinder head. This fuel insert can then be examined to determine whether the fuel insert is aligned with the fuel injector, as described herein. If the passages in the fuel insert are not aligned with the fuel injector, the fuel insert can be re-positioned and/or replaced with another fuel insert until the fuel passages of a fuel insert are aligned with the fuel injector.

A seal may be positioned between the fuel insert and the cylinder head. For example, a sealing washer, gasket, or shim can be disposed between the fuel insert and the cylinder head, and may be partially compressed between the fuel insert and the cylinder head. The fuel insert can be partially screwed onto the threads of the injector sleeve 1000 (e.g., shown in FIG. 10 and described below) with the seal between the fuel insert and the cylinder head, but without entirely screwing the fuel insert onto the threads. The focus or focal point of the sensor device can be checked and modified, if needed, prior to inserting the lens end of the sensor device into the outlet of the interior passage in the spray insert. Once the passages of the fuel insert are aligned, the fuel insert may be torqued or screwed onto the injector sleeve to compress the seal between the fuel insert and cylinder head (while also securing the fuel insert to the cylinder head).

A light source can be used to illuminate the spray hole of the fuel injector. This may be a direct light source (e.g., the cabled light source of the sensor device) that directs the light along the length of the flexible tube to illuminate the interior of the interior passage. Optionally, an independent or separate light source can be used, such as another light source that is separately controlled and that provides additional direct light into the interior passage. For example, a laser light source, light-emitting diode, or other lamp can be inserted into or oriented in the spray insert so that light is directed toward the spray hole of the fuel injector. The light source can be an indirect light source that directs light along another direction that is not along the length of the flexible tube. For example, the light source can be inserted into a passage of the spray insert that is different from the passage into which the lens or camera end of the sensor device is inserted. This passage can be an air or gas passage, or can be another fuel passage. The direct or indirect light source may emit polarized light or another type of light. Using a direct and/or indirect light source can improve the quality of the output from the sensor device (e.g., by reducing glare), thereby making the spray hole more easily seen by the operator. Additionally, use of a polarized light source and a polarization filter can reduce glare from the surrounding metal to provide clearer images.

Rather than imaging one of the spray holes of the nozzle tip of the fuel injector, a mark can be added to the tip of the fuel injector, such as a machined feature or a painted feature. This mark can act as a reference mark for alignment purposes. This mark would serve as a reference mark that is referenced to the injector holes. That mark may be imaged through one of the interior passages of the spray insert or another access passage may be created or identified for aligning the mark. This mark also can help reduce glare of the direct or indirect light source.

The alignment mark could be located a known rotational angle from the fuel injector spray hole so that the mark could be located with the inspection system through the interior passage of the spray insert. If the fuel injector and the spray insert are not aligned, the inspection system could subsequently index the fuel injector and/or spray insert by an appropriate amount to align the fuel spray holes with the interior passage(s).

Figure 6:
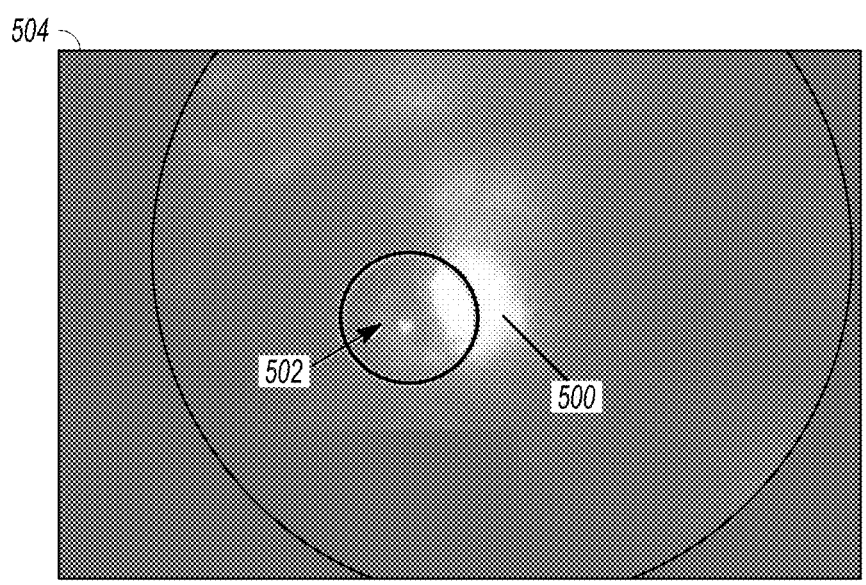
FIG. 6 illustrates output of the sensor device while the spray opening of the fuel injector and the interior passage of the spray insert are not aligned with each other.

FIG. 6 illustrates output 504 of the sensor device while the spray opening of the fuel injector and the interior passage of the spray insert are not aligned with each other. The output of the sensor device can be a video or image of a field of view of the lens or camera of the sensor device. The spray hole of the fuel injector appears as a darkened area or pit 502 in the output of the sensor device. A bright circle 500 represents the location of the interior passage of the spray insert. The operator or automated system can inspect the sensor device output shown in FIG. 6 and determine that the spray hole of the fuel injector is not aligned with the interior passage because the spray hole is not located within the bright circle of the interior passage. The operator or inspection system can then move the fuel injector and/or spray insert, or replace the spray insert, so that the spray opening of the fuel injector and the interior passage of the spray insert are aligned.

Figure 7:
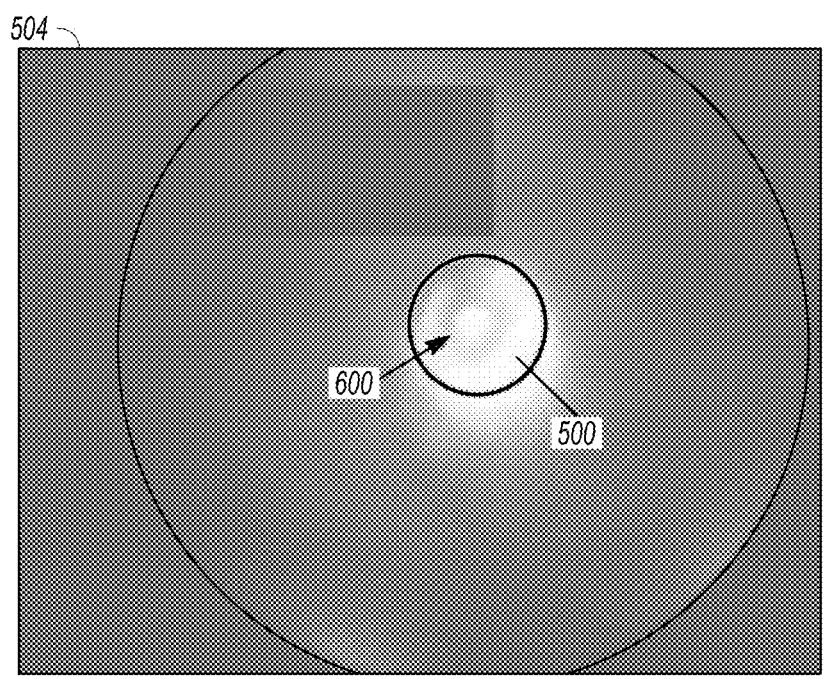
FIG. 7 illustrates output of the sensor device while the spray opening of the fuel injector and the interior passage of the spray insert are aligned with each other.

FIG. 7 illustrates output of the sensor device while the spray opening of the fuel injector and the interior passage of the spray insert are aligned with each other. As shown, the spray opening of the fuel injector appears as a gray or darker circle 600 within the illuminated circle 500 of the interior passage. This can indicate that the spray opening is aligned with the interior passage of the spray insert. The operator and/or inspection system can inspect the sensor device output shown in FIG. 6 and determine that the spray hole of the fuel injector is aligned with the interior passage. The operator or inspection system can then remove the sensor device from the spray insert.

Figure 8:
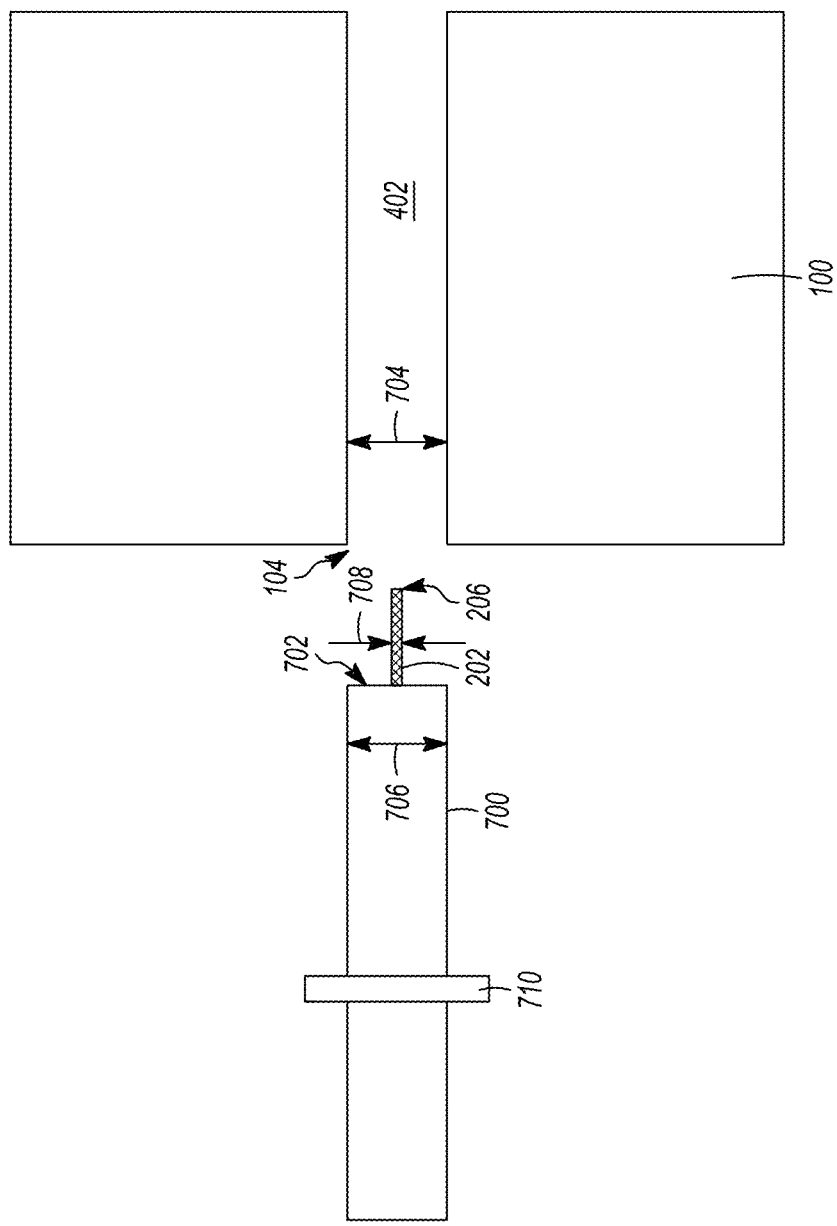
FIG. 8 illustrates one example of a slip fit alignment tool attached with the sensor device.

FIG. 8 illustrates one example of a slip fit alignment tool 700 attached with the sensor device. The slip fit alignment tool can represent a sleeve or sheath disposed around part of the flexible tube of the sensor device. The slip fit alignment tool can be slid onto the lens or camera end of the sensor device with the lens or camera end protruding beyond an outer or distal end 702 of the slip fit alignment tool. The slip fit alignment tool may be sized to closely fit within the interior passage of the spray insert.

The flexible tube of the sensor device may be smaller than an inner diameter 704 of the interior passage of the spray insert. For example, an outer diameter 708 of the sensor device at or near the lens or camera end may be less than one millimeter, while the inner diameter of the interior passage can be for example, 2 millimeters.

An outer diameter 706 of the slip fit alignment tool may be smaller than the inner diameter of the interior passage of the spray insert, but larger than the outer diameter of the sensor device at the lens or camera end of the sensor device. For example, the outer diameter of the slip fit alignment tool may be two millimeters, three millimeters, or the like. The slip fit alignment tool can fill much or all of the space between the tube of the sensor device and the inner diameter of the interior passage of the spray insert. This can help center the lens or camera end of the sensor device in the interior passage of the spray insert so that the lens or camera end is aligned and oriented toward the inlet of the interior passage.

The alignment tool can include a depth adjuster device 710 along the outer surface of the sleeve or sheath. This depth adjuster device can include an O-ring, nylon disk, or other non-crimp able body that is attached to the outside surface of the sleeve or sheath. The depth adjuster device limits how far the exposed lens end of the flexible tube of the sensor device protrudes into the interior passage of the spray device. The depth adjuster device can be larger than the outlet of the interior passage of the spray device. The depth adjuster device can be placed a distance from the distal end of the sheath or sleeve that causes the lens end of the sensor device to be at the same depth or distance inside the interior passage. This depth or distance can be set to be a focal point or focal length of the lens, such as a position that causes the spray hole to be in focus when the lens end of the flexible tube is inserted into the interior passage. Use of the sleeve or sheath and the depth adjuster device can allow the sensor device to more rapidly be used to inspect multiple spray inserts as the lens end of the sensor device will repeatedly be inserted at the same depth and aligned along the length of the interior passages of the spray inserts.

Figure 9:
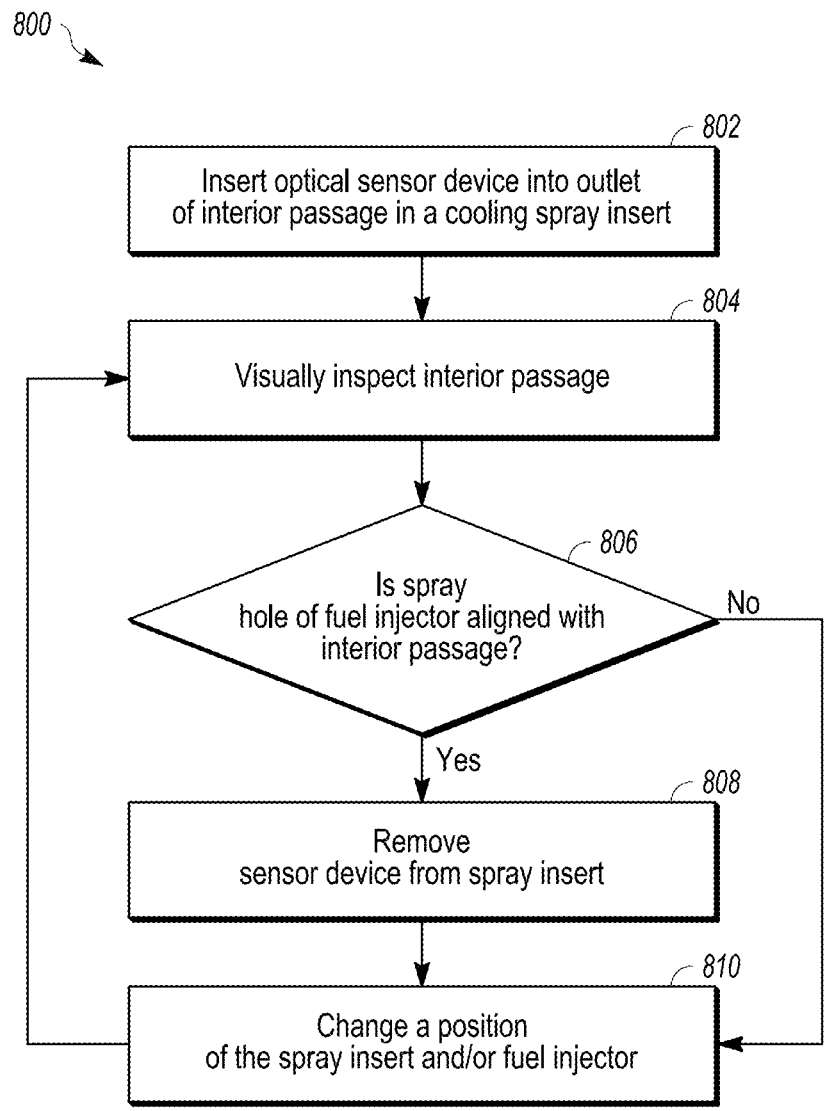
FIG. 9 illustrates a flowchart of one example of a method for aligning an interior passage of a spray insert with a spray hole of a fuel injector.

FIG. 9 illustrates a flowchart of one example of a method 800 for aligning an interior passage of a spray insert with a spray hole of a fuel injector. The method includes inserting an optical sensor device into an outlet of the interior passage of the spray insert at step 802. Optionally, a slip fit alignment tool that can include a depth adjuster device may be placed over part of the sensor device at the lens or camera end of the sensor device before inserting the lens or camera end into the outlet. At step 804, the interior of the interior passage of the spray insert is visually inspected. The interior passage may be manually inspected by an operator looking into the eyepiece of the sensor device or viewing the output of a camera on a screen or the interior passage may be automatically inspected by the inspection system. At step 806, the visual inspection is used to determine whether the spray hole of the fuel injector is aligned with the interior passage of the spray insert. If the spray hole and interior passage are aligned with each other, then the sensor device can be removed from the spray insert as the fuel injector and spray insert are determined to be properly aligned (at step 808). As a result, the spray insert and fuel injector may be ready for use in an engine. If the spray hole and interior passage are not aligned with each other, then the spray insert and/or the fuel injector can be moved (at step 810), as described above, and flow of the method can return toward 804 to check the alignment of the spray hole and interior passage, as described above.

In one embodiment, the alignment of the nozzles holes and spray insert holes is evaluated for alignment such that the centerline of a nozzle outlet and a spray insert inlet is the evaluated metric. In another embodiment, the cone of fuel spray from the nozzle hole is evaluated relative to the outer diameter of the spray insert inlet. The fuel spray cone size may be estimated, modeled or measured. The alignment process, then, may adjust various parameters of the system that are available to be adjusted. For example, the fuel spray cone's cross-sectional profile can be a function of the distance that the fuel travels from the nozzle (with consistent pressure and fuel characteristics). Accordingly, in the event that the fuel cone impacts the spray insert outside of the target spray insert inlet the distance between the nozzle outlet and the spray insert inlet may be adjusted to achieve a desired state. A desired state may be, for example, where the spray fuel cone entirely enters the inlet. Naturally, a narrow cone (such as a stream) would be easier to contain within an inlet relative to a very widely expanding, however the narrower the cone then the less fuel/oxidant mixing may occur. As such, the system in one embodiment may try to maximize the cone width while maintaining the desired alignment.

In one embodiment, the system may adjust the cone width itself, for example, by adjusted the pressure at which the fuel control system injects the fuel stream through the nozzle. The system, for example, may set a maximum pressure injection threshold based on a calculation that additional pressure would create a cone that is so wide that it does not entirely stream into the inlet. Other factors may be considered in other embodiments. For example, if a fuel characteristic (such as viscosity) is known a spray pattern may be calculable by the system. And, a determination that a viscosity produces a cone that is undesirably wide (relative to the inlet) the system may compensate by adjusting other parameters to keep the fuel spray cone properly aligned with the inlet. Other parameters may include pulsing the fuel, adjusting fuel pressure, and adjusting the timing of the fuel injection.

As the spray insert wears over time, the selection of fuel injector nozzles may compensate for changes. In a situation where the spray insert fuel passages narrow (such as due to build up on the inlet's inner surface) injector nozzles may be selected that inject a narrower cone of fuel and thus maintain the fuel spray cone within the inlet passageway. In a situation where the spray insert fuel passage widens (such as due to erosion or loss of material from the fuel passage sidewall) nozzles may be selected that either produce the same cone size or even a larger cone size (and thus increase the mixing potential and efficiency of an unworn system.

Figure 10:
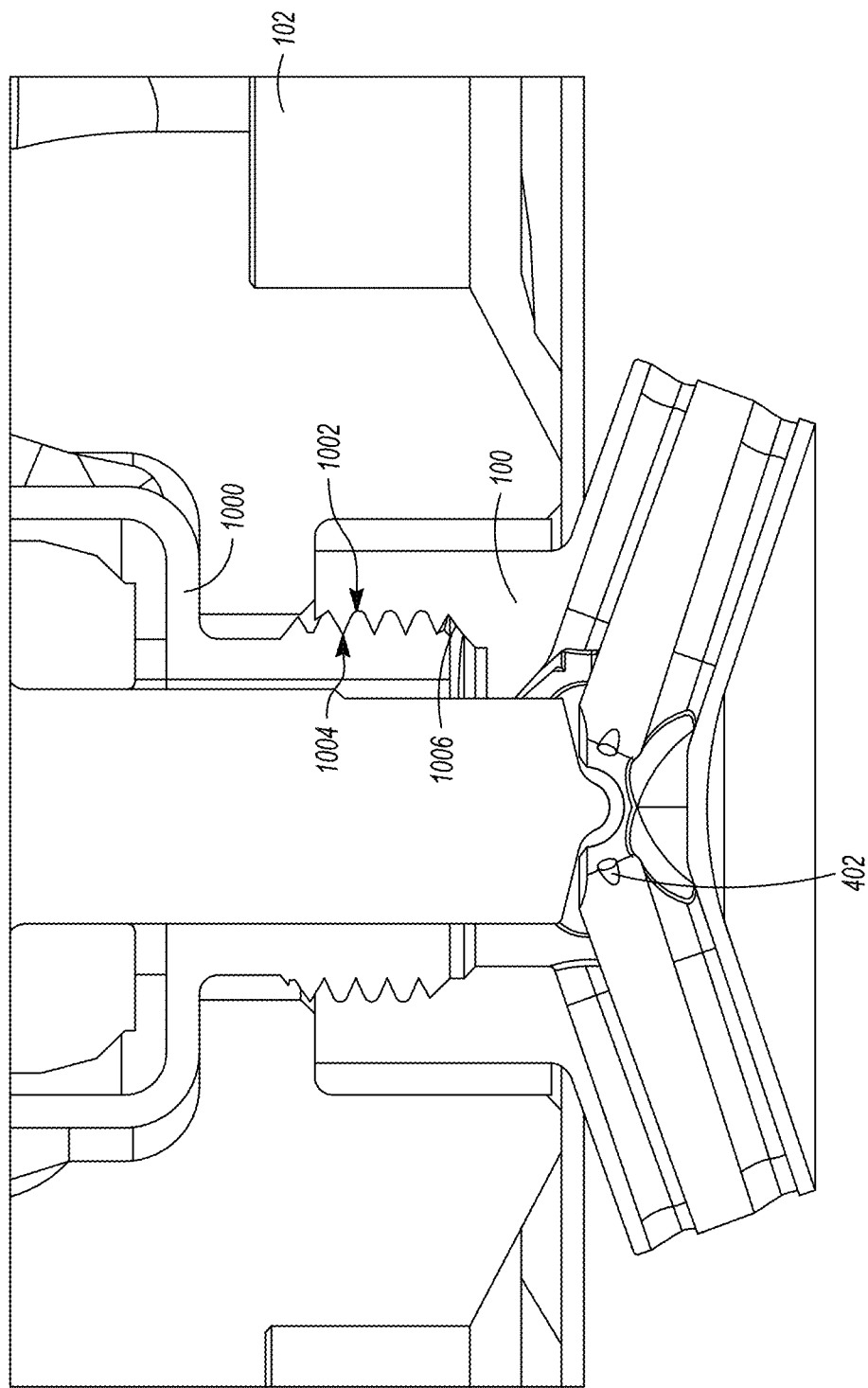
FIG. 10 illustrates a cross-sectional view of another example of aligning the insert device with the fuel injector.

FIG. 10 illustrates a cross-sectional view of another example of aligning the insert device with the fuel injector. As shown in this Figure, the spray insert is coupled with the injector sleeve 1000. The sleeve optionally can be threaded onto or into the insert device and rest against a shoulder on the cylinder head. The sleeve can support the fuel injector and retain the insert device in position relative to the fuel injector. As shown, the sleeve may include external threads

1002 that mate with internal threads 1004 disposed along an internal surface 1006 of the insert device. These external threads and internal threads may mate with each other to secure the insert device to the sleeve, and thereby secure the insert device relative to the cylinder head.

During installation of the insert device, the injector may be installed in the cylinder head and the internal threads of the insert device may be coupled (e.g., screwed onto) the external threads of the sleeve. The insert device may be screwed onto the sleeve using a manual level of torque, such as a finger-tight level of torque, that an average person of average strength is able to produce manually with his or her hands and without any additional tools. Furthermore, the injector clamp may be installed on the injector and the hold-down bolt may be installed to a finger-tight level of torque. The position of the insert device may be adjusted as described herein to ensure that the fuel passage of the body of the insert device is aligned with the spray hole of the fuel injector.

Once this alignment is achieved or reached, a mark 1008 (shown in FIG. 3) may be made onto the body of the insert device relative to a mark 1010 (shown in FIG. 3) on the cylinder head or marks may be made on both the body of the insert device and the cylinder head to show the rotational position of the insert device that aligns the fuel passage(s) of the insert device with the spray hole(s) of the fuel injector. For example, an ink line may be drawn on the insert device in a location that is collinear with a mark already on the cylinder head, an ink line may be drawn on the cylinder head in a location that is collinear with a mark already on the insert body, or an ink line may be drawn on and from the insert device onto the cylinder head (e.g., a line that extends across the interface between the insert device and the cylinder head). Alternatively, another mark or marks may be made on the insert device and/or cylinder head to at least temporarily record the rotational position at which the insert device is aligned with the fuel injector, as described above. The marks may be added or created using ink or another material, or optionally may be cut into the spray insert and/or the cylinder head. For example, a sharp tool may be used to punch, indent, or etch one or more of the marks in the spray insert and/or the cylinder head. Alternatively, the marks may be fabricated into the spray insert and/or cylinder head, such as by additively manufacturing, casting, molding, etc., the bodies of the spray insert and/or the cylinder head to include elongated grooves or recesses as the marks.

The fuel injector may then be removed from the cylinder head (e.g., in a direction away from the insert device, or vertically up in FIG. 10). The sleeve may then be torqued or screwed onto the insert device (and, optionally, cylinder head if the cylinder head includes internal threads that can mate with the external threads of the sleeve) with greater force than the manual force described above. For example, an elongated tool, such as a ratchet, wrench, or the like, and/or a power tool may be used to apply a moment of force to the sleeve to increase the force used to rotate the sleeve (above what can be manually applied without a tool) relative to the cylinder head and/or the insert body. The insert body may remain aligned with the fuel injector during this torquing of the sleeve by keeping the mark on the insert device aligned (e.g., collinear) with the mark on the cylinder head. The fuel injector may then be installed into the cylinder head with the spray holes of the fuel injector aligned with the spray insert, as described above.

While the subject matter described herein specifically describes alignment between a fuel injector and a spray insert, the subject matter also can be applied to ducted fuel injection as well as any number of other combustion enhancing technologies where a fixture needs to be precisely located with respect to a fuel spray nozzle. Moreover, one embodiment may be used to align a passage of a first body with a passage or opening of a second body.

In one embodiment, a method is provided that includes inserting an optical sensor device into a fuel passage of a body that is located between a fuel injector and a combustion chamber of an engine cylinder. The body is shaped to transmit fuel ejected from a spray hole in a fuel injector into the combustion chamber of the engine cylinder. The method also includes determining whether the fuel passage of the body is aligned with the spray hole of the fuel injector based on output from the optical sensor device, and changing a position of one or more of the body or the fuel injector responsive to determining that the fuel passage of the body is not aligned with the spray hole of the fuel injector.

The body may be a spray insert that mixes the fuel from the fuel injector with air as the fuel is transmitted through the spray insert. The body may be a fuel duct. Changing the position of the one or more of the body and/or the fuel injector may include one or more of rotating the body relative to the fuel injector and/or rotating the fuel injector relative to the body.

Changing the position of the one or more of the body and/or the fuel injector may include one or more of axially moving the body relative to the fuel injector and/or axially moving the fuel injector relative to the body. The method also may include placing a slip fit alignment tool over the optical sensor device to reduce a gap between an inner diameter of the interior passage of the body and an outer diameter of the optical sensor device. The slip fit alignment tool may be placed over the optical sensor device such that a lens on a distal end of the optical sensor device protrudes out of an end of the slip fit alignment tool. The method also may include placing a depth adjuster device around the optical sensor device in a location that positions a lens on a distal end of the optical sensor device to be focused on the spray hole of the fuel injector.

Determining whether the fuel passage of the body is aligned with the spray hole of the fuel injector may include determining whether the fuel passage and the spray hole are coaxial with each other. The method also may include removing the optical sensor device from the fuel passage of the body responsive to determining that the fuel passage of the body is aligned with the spray hole of the fuel injector. The method may include inserting a light source into the body to improve imaging quality. The light source may be inserted into the fuel passage. Or the light source may be inserted into a passage of the body other than the fuel passage. The light source may be positioned to transmit light via an optical path that is coaxial with an imaging path extending along a length of the fuel passage. The light source may generate polarized light and further comprising using one or more polarized filters to improve image quality.

The method also may include adding a mark or feature to the injector nozzle in a mark location that is a designated distance from a hole location of the spray hole of the fuel injector. Determining whether the fuel passage of the body is aligned with the spray hole of the fuel injector may include visually inspecting the fuel injector through the fuel passage to find the visible mark or feature.

Changing the position of one or more of the body and/or the fuel injector may include indexing one or more of the body or the fuel injector by a designated rotational distance or a designated axial distance associated with the mark location and the hole location. One or more of inserting the optical sensor device, determining whether the fuel passage is aligned, and/or changing the position of one or more of the body or the fuel injector may be performed by an automated inspection system. Inserting the optical sensor device and determining whether the fuel passage is aligned may involve concurrently inserting multiple ones of the optical sensor device into multiple ones of the fuel passage in multiple ones of the body and determining whether one or more of the fuel passages are aligned with corresponding fuel injectors. The optical sensor device may be a borescope.

In one embodiment, an alignment system includes an optical sensor device that may be inserted into a fuel passage of a body that is located between a fuel injector and a combustion chamber of an engine cylinder. The body is shaped to transmit fuel ejected from a spray hole in a fuel injector into the combustion chamber of the engine cylinder. The system also includes a controller that may examine output of the optical sensor device and determine whether the fuel passage of the body is aligned with the spray hole of the fuel injector based on the output from the optical sensor device. The controller may change a position of one or more of the body or the fuel injector responsive to determining that the fuel passage of the body is not aligned with the spray hole of the fuel injector.

The body may be a spray insert that mixes the fuel from the fuel injector with air as the fuel is transmitted through the spray insert. The body may be a duct. The controller may change the position of the one or more of the body or the fuel injector by one or more of rotating the body relative to the fuel injector or rotating the fuel injector relative to the body. The controller may change the position of the one or more of the body and/or the fuel injector by one or more of axially moving the body relative to the fuel injector and/or axially moving the fuel injector relative to the body. The axial changing may be done using shims, crushable gaskets or washers, different sized sleeves or different sized inserts, etc.

The controller may determine whether the fuel passage of the body is aligned with the spray hole of the fuel injector by determining whether the fuel passage and the spray hole are coaxial with each other. The controller may remove the optical sensor device from the fuel passage of the body responsive to determining that the fuel passage of the body is aligned with the spray hole of the fuel injector. The controller may insert a light source into the body to improve imaging quality. The controller may insert the light source into the fuel passage.

The controller may insert the light source into a passage of the body other than the fuel passage. The controller may insert the light source into the body such that light from the light source is transmitted via an optical path that is coaxial with an imaging path extending along a length of the fuel passage. The controller may use one or more polarized filters to improve image quality. The controller may determine whether the fuel passage of the body is aligned with the spray hole of the fuel injector by visually inspecting the fuel injector through the fuel passage to find a visible mark or feature on the fuel injector.

The controller may change the position of one or more of the body and/or the fuel injector by indexing one or more of the body and/or the fuel injector by a designated rotational distance or a designated axial distance associated with a location of the mark and a location of the spray hole. The controller may concurrently insert multiple ones of the optical sensor device into multiple ones of the fuel passage in multiple ones of the body and is configured to determine whether one or more of the fuel passages are aligned with corresponding fuel injectors. The optical sensor device may be a borescope.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   inserting an optical sensor device into a passage of a body that is located between a fuel injector and a combustion chamber of an engine cylinder, the body configured to transmit fuel ejected from a spray hole in a fuel injector into the combustion chamber of the engine cylinder;

determining whether the passage of the body is aligned with the spray hole of the fuel injector based on output from the optical sensor device; and changing a position of one or more of the body or the fuel injector responsive to determining that the passage of the body is not aligned with the spray hole of the fuel injector.

2. The method of claim 1, wherein the body is a spray insert that mixes the fuel from the fuel injector with air as the fuel is transmitted through the spray insert.

3. The method of claim 1, wherein the body is a fuel duct.

4. The method of claim 1, wherein changing the position of the one or more of the body or the fuel injector includes one or more of rotating the body relative to the fuel injector or rotating the fuel injector relative to the body.

5. The method of claim 1, wherein changing the position of the one or more of the body or the fuel injector includes one or more of axially moving the body relative to the fuel injector or axially moving the fuel injector relative to the body.

6. The method of claim 5, wherein changing the position of the one or more of the body or the fuel injector involves changing one or more of a shim, a gasket, a different insert, or a different injector sleeve to provide axial movement of the body.

7. The method of claim 1, further comprising placing a slip fit alignment tool over the optical sensor device to reduce a gap between an inner diameter of the passage of the body and an outer diameter of the optical sensor device, wherein the slip fit alignment tool is placed over the optical sensor device such that a lens on a distal end of the optical sensor device protrudes out of an end of the slip fit alignment tool.

8. The method of claim 1, further comprising placing a depth adjuster device around the optical sensor device in a location that positions a lens on a distal end of the optical sensor device to be focused on the spray hole of the fuel injector.

9. The method of claim 1, wherein determining whether the passage of the body is aligned with the spray hole of the fuel injector includes determining whether the passage and the spray hole are coaxial with each other.

10. The method of claim 1, further comprising removing the optical sensor device from the passage of the body responsive to determining that the passage of the body is aligned with the spray hole of the fuel injector.

11. An alignment system comprising:

an optical sensor device configured to be inserted into a passage of a body that is located between a fuel injector and a combustion chamber of an engine cylinder, the body configured to transmit fuel ejected from a spray hole in a fuel injector into the combustion chamber of the engine cylinder; and a controller configured to examine output of the optical sensor device and determine whether the passage of the body is aligned with the spray hole of the fuel injector based on the output from the optical sensor device, the controller configured to change a position of one or more of the body or the fuel injector responsive to determining that the passage of the body is not aligned with the spray hole of the fuel injector.

12. The system of claim 11, wherein the body is a spray insert that mixes the fuel from the fuel injector with air as the fuel is transmitted through the spray insert.

13. The system of claim 11, wherein the controller is configured to change the position of the one or more of the body or the fuel injector by one or more of rotating the body relative to the fuel injector or rotating the fuel injector relative to the body.

14. The system of claim 11, wherein the controller is configured to change the position of the one or more of the body or the fuel injector by one or more of axially moving the body relative to the fuel injector or axially moving the fuel injector relative to the body.

15. The system of claim 11, wherein the controller is configured to determine whether the passage of the body is aligned with the spray hole of the fuel injector by determining whether the passage and the spray hole are coaxial with each other.

16. The system of claim 11, wherein the controller is configured to remove the optical sensor device from the passage of the body responsive to determining that the passage of the body is aligned with the spray hole of the fuel injector.

17. The system of claim 11, wherein the controller is configured to insert a light source into the body to improve imaging quality.

18. The system of claim 11, wherein the controller is configured to concurrently insert multiple ones of the optical sensor device into multiple ones of the passage in multiple ones of the body and is configured to determine whether one or more of the passages are aligned with corresponding fuel injectors.

19. The system of claim 11, wherein the optical sensor device is a borescope.

* * * * *